(No Model.)
J. W. STEELE.
NUT LOCK.
No. 286,498.          Patented Oct. 9, 1883.
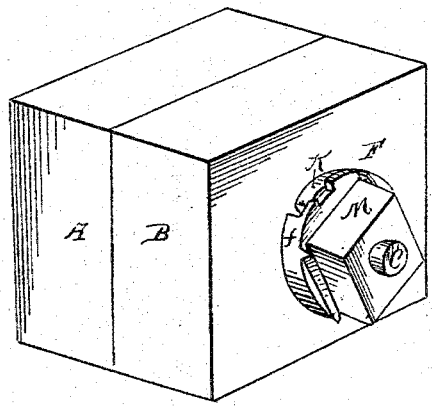
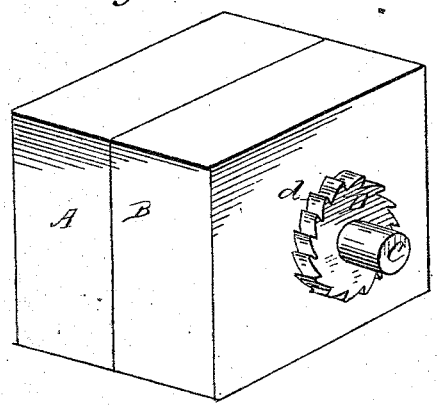
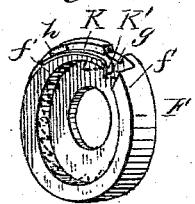
Witnesses:
C. W. Johnson
L. C. Hills
Inventor
John W. Steele
Attorney

UNITED STATES PATENT OFFICE.

JOHN W. STEELE, OF SPRAGUE, MISSOURI.

NUT-LOCK.

SPECIFICATION forming part of Letters Patent No. 286,498, dated October 9, 1883.

Application filed August 18, 1883. (No model.)

*To all whom it may concern:*

Be it known that I, JOHN W. STEELE, a citizen of the United States of America, residing at Sprague, in the county of Bates and State of Missouri, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of nut-locks which may be unlocked without damage and reapplied to the same or a different bolt and nut, the object of the invention being to provide a nut-lock of this class which is simple and durable in construction, easily applied, and readily unlocked without destroying its efficiency for reapplication.

The improvement consists in a novel construction and combination of parts, which will be readily understood from the following particular description, in connection with the accompanying drawings, in which—

Figure 1 is a perspective view of two blocks secured together by a bolt and nut having my improved nut-lock applied thereto. Fig. 2 is a similar view with the outer washer and nut removed. Fig. 3 is a perspective view of the two washers; and Fig. 4 is a view of the under or inner side of the outer washer, with the inner washer shown within it in dotted lines.

The letters A and B indicate two blocks, which, for the purpose of illustration, are shown in Fig. 1 as fastened together with a bolt and nut having my improved nut-lock applied thereto, while in Fig. 2 a portion of the lock and nut are removed.

C is the bolt passed through holes in the block.

D indicates the inner washer, which is circular in shape, and has a central aperture to fit loosely around the bolt. Its outer edge is provided with ratchet-teeth $d$ all around, and from its inner surface project short spurs or teats $e$, which enter indentations in the adjacent block to keep the washer from turning.

F is the outer washer, which has the form of a shallow cap, in the top of which is an aperture similar to that of the inner washer. The rim $f$ of the outer washer has a diameter which permits it to fit around the inner washer, and its depth is preferably equal to the thickness of said inner washer. A segmental portion, $f'$, of the rim $f$ is reduced in thickness, and at one end of this reduced portion an aperture, $g$, is cut through the rim, and at the other end a slit, $h$, is cut into the thick portion, to receive and hold one end of a curved spring, K, which lies along the segmental reduced portion of the rim, and has its other end bent to form a finger, K′, which projects inwardly through the aperture $g$. On the outer surface of the outer washer are two ribs, $l\ l$, one on each side of the bolt-hole, and between which is the seat of the nut M.

To use the lock, the inner washer, D, is first placed in position around the bolt, with its spurs $e\ e$ driven into the block to prevent its turning, and then the outer washer is placed over the bolt with its rim turned inward. The nut is then placed on the bolt and screwed down nearly to the outer washer, which should then be drawn out against the nut with its ribs on opposite sides thereof. The nut is then turned to drive down or on the outer washer, which rotates with it, and as the rim $f$ incloses the inner washer, the finger K′ of the spring K passes in between two of the teeth of the inner washer, and then rides over the teeth, as the outer washer and nut are turned, until the nut is screwed on as tightly as desired. The finger K′ of the spring then rests between two of the teeth of the inner washer, and will obviously prevent the outer washer from turning in the reverse direction. The outer washer being thus locked, the nut is of course locked also on account of its being seated between the ribs $l\ l$. In order to release the nut to remove it, a blade or point can be inserted between the spring K and the adjacent reduced portion of the rim of the outer washer, so as to force the spring outward and withdraw the finger K′ from engagement with the teeth of the inner washer. The nut and outer washer can then be turned freely backward, and in a few turns they will be withdrawn such a distance that the washer may be separated from the nut and the latter screwed off or as far out as desired.

I do not limit myself to the precise form of devices shown, as it is obvious that they might be varied without departing from the essential principle of my invention. For instance, the inner washer might have the ratchet-teeth formed on the margin of its outer face, and the spring could be arranged on the inner surface of the head of the outer washer, through which could be cut an aperture to afford access to the said spring. I wish it to be understood that I reserve to myself the right to make all alterations for the more efficient carrying out of my invention without departing from the true spirit and legitimate scope thereof.

What I claim is—

In a nut-lock, the construction, with the inner washer having means for securing it against turning, and provided with a series of ratchet-teeth around its edge, of the outer washer provided with a seat for holding a nut, and having a rim, $f$, with a reduced portion and an aperture at one end thereof, the spring secured outside of said reduced portion, and provided with a finger projecting inwardly through the aperture and arranged to engage the teeth of the inner washer, substantially as described.

In testimony whereof I affix my signature in presence of two witnesses.

JOHN W. STEELE.

Witnesses:
WILLIAM P. FARLEY,
GEORGE C. WOLFE.